US011961439B2

(12) United States Patent
Chen et al.

(10) Patent No.: US 11,961,439 B2
(45) Date of Patent: Apr. 16, 2024

(54) DISPLAY PANEL, DRIVING METHOD AND DISPLAY DEVICE

(71) Applicant: HKC CORPORATION LIMITED, Shenzhen (CN)

(72) Inventors: Jie Chen, Shenzhen (CN); Jianlei Li, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/876,555

(22) Filed: Jul. 29, 2022

(65) Prior Publication Data

US 2023/0030789 A1 Feb. 2, 2023

(30) Foreign Application Priority Data

Jul. 30, 2021 (CN) ......................... 202110870199.3

(51) Int. Cl.
*G09G 3/20* (2006.01)

(52) U.S. Cl.
CPC ....... *G09G 3/20* (2013.01); *G09G 2300/0452* (2013.01); *G09G 2310/0202* (2013.01)

(58) Field of Classification Search
CPC ... G09G 2300/0426; G09G 2300/0452; G09G 2310/0202
See application file for complete search history.

(56) References Cited

U.S. PATENT DOCUMENTS

| | | | | |
|---|---|---|---|---|
| 2016/0131954 | A1* | 5/2016 | Li | G09G 3/36 349/33 |
| 2016/0334684 | A1* | 11/2016 | Li | G02F 1/133514 |
| 2019/0073938 | A1* | 3/2019 | Shi | G09G 3/3275 |
| 2020/0119107 | A1* | 4/2020 | Liu | H10K 59/353 |
| 2021/0390904 | A1* | 12/2021 | Xuan | G09G 3/3225 |
| 2022/0319422 | A1* | 10/2022 | Li | H10K 59/1315 |

FOREIGN PATENT DOCUMENTS

| | | | |
|---|---|---|---|
| CN | 101226290 | A | 7/2008 |
| CN | 108773262 | A | 5/2017 |
| CN | 113284427 | A | 8/2021 |

OTHER PUBLICATIONS

CN113284427A Display panel and spliced display screen Chen Jie Aug. 20, 2021 (Year: 2021).*

* cited by examiner

*Primary Examiner* — Van N Chow

(57) ABSTRACT

A display panel, a driving method and a display device are disclosed. The display panel is divided into a first area and a second area arranged along a data line direction. Multiple sub-pixels corresponding to a same row of scan line are connected to data lines in one-to-one correspondence. In the first area and second area, each column of sub-pixels is arranged between two adjacent data lines, where the same column of sub-pixels includes multiple sub-pixel groups, each of which includes at least one sub-pixel. Among two adjacent data lines, one data line is connected with the sub-pixels in the odd groups, and the other is connected with the sub-pixels in the even groups. The sub-pixel groups in the first area and the corresponding sub-pixel groups in the second area are axially symmetrical with respect to a boundary line between the first area and the second area.

13 Claims, 8 Drawing Sheets

DISPLAY PANEL, DRIVING METHOD AND DISPLAY DEVICE

CROSS-REFERENCE TO RELATED APPLICATIONS

This application claims the priority and benefit of Chinese patent application 2021108701993, entitled "Display Panel, Driving Method and Display Device" and filed Jul. 30, 2021, with China National Intellectual Property Administration, the entire contents of which are incorporated herein by reference.

TECHNICAL FIELD

This application relates to the field of display technology, and more particularly relates to a display panel, a driving method and a display device.

BACKGROUND

The statements herein are intended for the mere purpose of providing background information related to the present application and do not necessarily constitute prior art.

Nowadays, when a liquid crystal panel is used, according to the actual required display effect, the panel is required to have the function of forward and reverse scanning. For some current panel designs, the starting and ending RGB pixels are arranged in sequence. If reverse scanning is needed, then the scan mode data read by the timing controller needs to be switched to send the display data to the source driver in reverse.

If the data signal processing is not performed, in the flip pixel architecture, when the scanning direction of the display panel is in the opposite direction, the incoming data direction is also one positive and one negative, which will cause the distortion of the image. If data processing is performed, the timing of the data signal output must correspond to the pixels one by one, and the data signal needs to be set and adjusted before the forward and reverse scanning is performed, which is very time-consuming.

SUMMARY

It is therefore a purpose of the present application to provide a display panel, a driving method and a display device, which can realize forward scanning and reverse scanning of scan lines of the display panel without processing data signals.

The present application discloses a display panel, including a plurality of data lines, a plurality of scan lines, and a plurality of pixels. Each of said pixels includes a plurality of sub-pixels of different colors. A plurality of the scan lines cross the data lines. Each sub-pixel is driven by the respective data line and respective scan line. The display panel is divided into a first area and a second area, and the first area and the second area are arranged along the direction of the respective data line. Each of the pixels includes a plurality of sub-pixels of different colors, and the sub-pixels in the same column have the same color. The number of sub-pixels in the first area and the number of sub-pixels in the second area are the same. Multiple sub-pixels corresponding to the same row of scan line are respectively connected to the data lines in one-to-one correspondence. In the first area and the second area, each column of sub-pixels is arranged between two adjacent data lines. The same column of sub-pixels includes a plurality of sub-pixel groups, and each of the sub-pixel groups includes at least one of the sub-pixels. Along the data line direction, the plurality of sub-pixel groups are divided into odd and even groups. Among the two adjacent data lines, one of the data lines is connected with the sub-pixels in the odd group, and the other data line is connected with the sub-pixels in the even group. The sub-pixel group in the first area and the corresponding sub-pixel group in the second area are axially symmetrical with respect to the boundary line between the first area and the second area.

Optionally, each sub-pixel group includes only one sub-pixel. In the first area or the second area, in the same column of sub-pixels, the sub-pixel corresponding to the last row of scan line in the first area and the sub-pixel corresponding to the first row of scan line in the second area are connected to the same data line.

Optionally, each sub-pixel group includes only two sub-pixels. In the first area or the second area, in the same column of sub-pixels, the sub-pixels corresponding to the last two rows of scan lines in the first area and the sub-pixels corresponding to the first two rows of scan lines in the second area are connected to the same data line.

Optionally, the interval between the sub-pixel corresponding to the last row of scan line in the first area and the sub-pixel corresponding to the first row of scan line in the second area is a first interval. The interval between two sub-pixels corresponding to two adjacent rows of scan lines in the first area or the second area is a second interval, where the first interval and the second interval have the same length.

Optionally, the sub-pixels connected to the same data line have the same pixel polarity.

The present application also discloses a driving method, which can be used to drive any of the above-mentioned display panels, and the driving method includes the following operations:

determining the current scan mode, and starting the forward scan mode or the reverse scan mode depending on the current scan mode;

if the forward scan mode is enabled, scanning sequentially from the first row of scan line corresponding to the first area to the last row of scan line in the second area; if the reverse scan mode is enabled, scanning sequentially from the last row of scan line in the second area to the first row of scan line corresponding to the first area.

Optionally, the operation of determining the current scanning mode and starting the forward scanning mode or the reverse scanning mode depending on the current scan mode includes the following operations:

obtaining a signal reflecting the current scan mode, analyzing the signal according to a preset rule, and obtaining the current scan mode; starting the forward scan mode or the reverse scan mode according to the current scan mode.

The present application also discloses a display device, including the display panel described above and a driving circuit, wherein the driving circuit drives the display panel.

Optionally, the display device includes at least two adjacent display panels, the display panels are arranged along a data line direction, and the adjacent display panels have opposite scanning directions.

Optionally, the drive circuit includes a forward scan module, a reverse scan module and an analysis module. The analysis module includes an input end, a first output end and a second output end. The first output end is connected with the input end of the forward scanning module, and the second output end is connected with the input end of the reverse scanning module. The input end of the analysis module is used to obtain a signal reflecting the current scan mode, and analyze the signal according to a preset rule to obtain the current scan mode. If the current scanning mode is the forward scanning mode, the forward scanning module is driven to operate through the first output end. If the current scan mode is the reverse scan mode, the reverse scan module is driven to operate through the second output end.

Compared with the solution of a display panel using an entire flip pixel architecture, the present application divides an entire flip pixel architecture into two symmetrical flip pixel architectures. That is, the display panel is divided into a first area and a second area that are symmetrically up and down, and the first area and the second area are two symmetrical flip pixel structures. The sub-pixel group in the first area and the corresponding sub-pixel group in the second area are arranged axially symmetrically with respect to the boundary line between the first area and the second area, thus realizing the mirror image of the reverse scan of the flip pixel architecture, and so there is no need to worry about data incompatibility when the scan line is scanned forward or backward.

BRIEF DESCRIPTION OF DRAWINGS

The accompanying drawings, which are included to provide a further understanding of the embodiments of the present application, constitute a part of the specification, are used to illustrate the embodiments of the present application, and together with the written description, serve to explain the principles of the present application. Obviously, the drawings used in the following description merely depict some embodiments of the present application, and for those having ordinary skill in the art, other drawings can also be obtained from these drawings without investing creative effort. In the drawings.

DETAILED DESCRIPTION OF EMBODIMENTS

Figure 1:
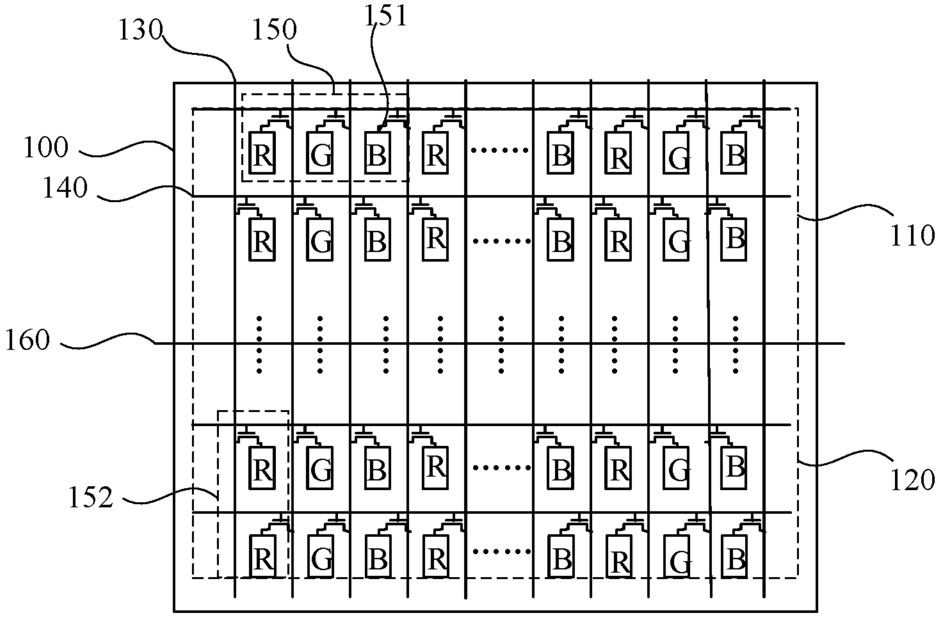
FIG. 1 is a schematic diagram of a pixel structure of a display panel according to a first embodiment of the present application.

It should be understood that the terminology used herein, the specific structural and functional details disclosed are intended for the mere purpose of describing specific embodiments and are representative, but the present application may be embodied in many alternative forms and should not be construed as limited only the embodiments set forth herein.

In the description of this application, the terms “first” and “second” are merely used for description purposes, and cannot be understood as indicating relative importance, or implicitly indicating the number of indicated technical features. Thus, unless otherwise specified, features defined as “first” and “second” may expressly or implicitly include one or more of the features; “plurality” means two or more. The terms “including”, “comprising”, and any variations thereof are intended to mean a non-exclusive inclusion, namely one or more other features, integers, steps, operations, units, components and/or combinations thereof may be present or added.

In addition, terms such as “center”, “transverse”, “lateral”, “above”, “on”, “under”, “below”, “left”, “right”, “vertical”, “horizontal”, “top”, “bottom”, “inside”, “outside”, etc., indicative of orientations or positional relationships are described based on the orientations or relative positional relationships illustrated in the drawings, and are intended for the mere purpose of convenience of simplified description of the present application, rather than indicating that the device or element referred to must have a specific orientation or be constructed, and operate in a particular orientation. Thus, these terms should not be construed as limiting the present application.

In addition, unless otherwise expressly specified and defined, terms “installed on”, “connected to”, and “coupled to” should be understood in a broad sense. For example, it may be a fixed connection, a detachable connection, or an integral connection; it may be a mechanical connection, or may also be an electrical connection; it may be a direct connection, an indirect connection through an intermediate medium, or an internal connection between two components. For those having ordinary skill in the art, the specific meanings of the above terms in this application can be understood depending on specific contexts.

The present application will be described in detail below with reference to the accompanying drawings and optional embodiments.

Embodiment 1

FIG. 1 is a schematic diagram of a pixel structure of a display panel according to a first embodiment of the present application. As the first embodiment of the present application, a display panel 100 is disclosed. The display panel 100 includes a plurality of data lines 130, a plurality of scan lines 140 and a plurality of pixels 150. Each of the pixels 150 includes a plurality of sub-pixels 151 of different colors. Take three sub-pixels 151 of different colors as an example to illustrate. The three sub-pixels 151 with different colors are respectively a red sub-pixel (R), a green sub-pixel (G) and a blue sub-pixel (B). Of course, it can also be four pixels of different colors, such as RGBW. This application focuses on RGB, but is not limited to RGB.

Further, a plurality of scan lines 140 cross over the plurality of data lines 130. The sub-pixel 151 is driven by the respective data line 130 and respective scan line 140. The scan mode of scanning sequentially from the first row of scan line to the last row of scan line of the display panel 100 is the forward scan mode. The scan mode of scanning sequentially from the last row of scan line to the first row of scan line of the display panel 100 is the reverse scan mode.

In order to enable the same display panel to have the functions of forward scanning and reverse scanning, the present application changes the structure of the existing flip pixel, and changes an overall flip pixel structure into two vertically symmetrical filp pixel structures, namely a new type of flip pixel architecture. The display panel of the present application mainly adopts the new type of flip pixel architecture. Specifically, the display panel 100 is divided into a first area 110 and a second area 120 that are symmetrical up and down, and the first area 110 and the second area 120 are arranged along the data line direction. The two symmetrical filp pixel structures are respectively in the symmetrical first area 110 and the second area 120, and the sub-pixels 151 in the same column have the same color. For example, the sub-pixels 151 in the first column are all red sub-pixels, the sub-pixels 151 in the second column are all green sub-pixels, and the sub-pixels 151 in the third column are all blue sub-pixels. The number of sub-pixels in the first area 110 and the number of sub-pixels 151 in the second area 120 are the same. The plurality of sub-pixels 151 corresponding to the scan line 140 in the same row are respectively connected to the data lines 130 in a one-to-one correspondence.

In the first area 110 or the second area, each column of sub-pixels 151 is arranged between two adjacent data lines 130. The same column of sub-pixels includes a plurality of sub-pixel groups 152, and each of the sub-pixel groups 152 includes at least one of the sub-pixels 151. The sub-pixels 151 in the odd group are respectively connected to the same data line 130 of the two adjacent data lines 130, and the sub-pixels in the even group are respectively connected to another data line of the two adjacent data lines 130. The sub-pixel groups in the first area 110 and the corresponding sub-pixel groups in the second area 120 are axially symmetrical with respect to the boundary line between the first area 110 and the second area. Both ends of the first area 110 are arranged in the first row of scan line and the last row of scan line in the first area, and both ends of the second area 120 are arranged in the first row of scan line and the last row of scan line in the second area 120. The distance between the last row of scan line in the first area 110 and the first row of scan line in the second area 120 is the shortest, that is, the closest. The sub-pixels in the last row of the first area 110 and the sub-pixels in the first row of the second area 120 are symmetrically arranged with each other, and the specific symmetry is the symmetry of the pixel structure. The pixels of the first row of the first area and the pixels of the last row of the second area are symmetrical about the center line of the first area and the second area, and the last row of pixels in the first area is symmetrical with the first row of pixels in the second area about the center line of the first area and the second area. The number of pixel rows is equal in the two areas, and the number of pixels in each row is also the same. More specifically, the first pixel of the first row of the first area is symmetrical with the first pixel of the last row of pixels of the second area, and so on.

For any data line 130, when the last row of the first area 110 is turned on, the data is given by this data line, and when the last row of the second area 120 is turned on, the data is still given by this data line. One sub-pixel 151 corresponding to the same row of scan line 140 is only connected to one data line 130, and receives a data signal of this one data line 130. The sub-pixels 151 connected on a data line 130 are staggered from left to right. On a data line 130, the sub-pixel 151 corresponding to the first row of scan line is disposed on the left side of the data line 130, and the sub-pixel corresponding to the second row of scan line is disposed on the right side of the data line. When performing forward scanning, corresponding to the first row of scan line, the corresponding output signals on the data lines are in turn the signals corresponding to the RGB pixels. Corresponding to the last row of scan line of the display panel, the corresponding output signals on the data line 130 are sequentially the signals corresponding to the RGB pixels, and no data disorder will occur whether the forward scan or the reverse scan is performed.

Figure 2:
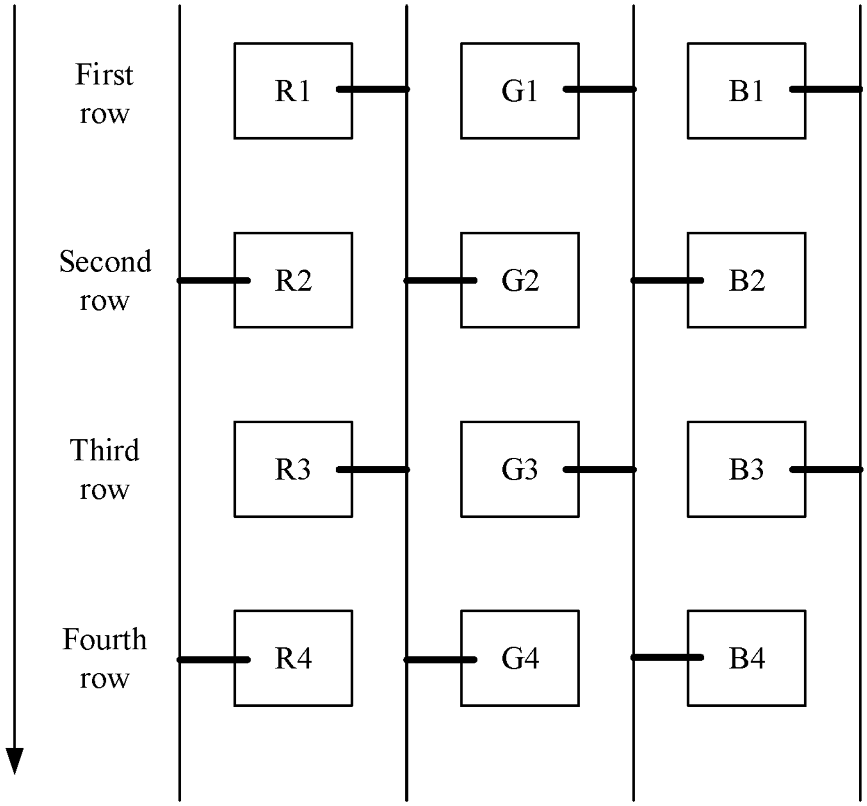
FIG. 2 is a schematic diagram of a forward scan of an exemplary display panel of the present application.
Figure 3:
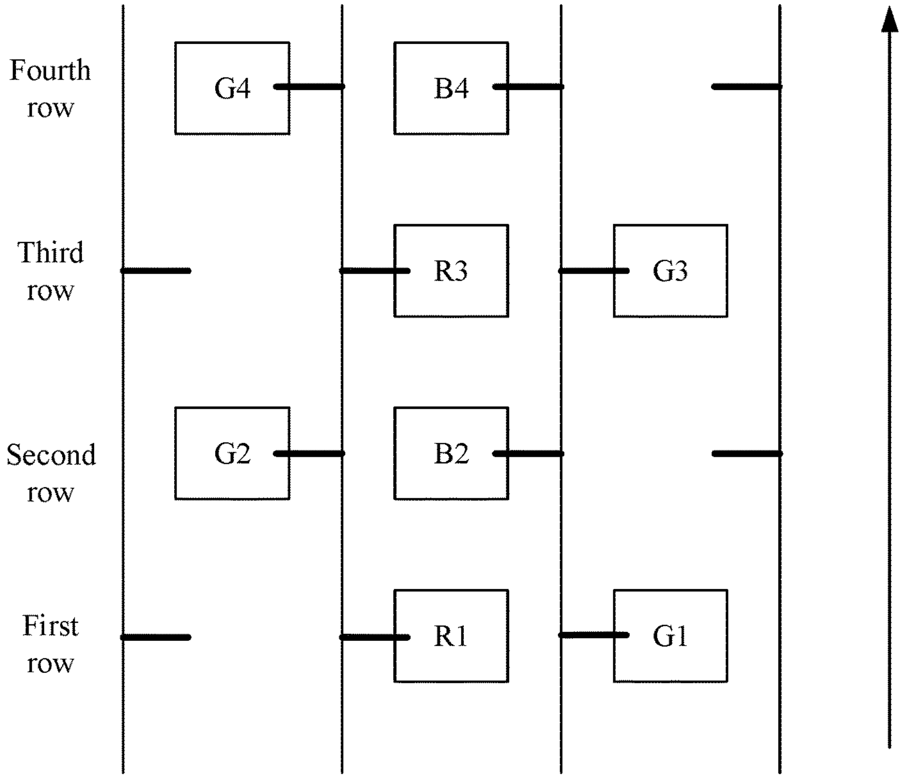
FIG. 3 is a schematic diagram of reverse scanning of an exemplary display panel of the present application.

FIG. 2 is a schematic diagram of a forward scan of an exemplary display panel of the present application. FIG. 3 is a schematic diagram of reverse scanning of an exemplary display panel of the present application. Exemplary flip pixel architectures are shown in FIGS. 2 and 3. The forward scan and the reverse scan in this exemplary structure are not symmetrically arranged, so when the reverse scan is performed, there will be problems with the data signals given to the corresponding pixels, and the data signals of the corresponding timing controllers are incompatible. Taking part of the pixels in the display panel for illustration, which however does not mean that only this part of the pixels has this effect. Specifically, as illustrated in FIG. 2, during forward scanning, the data signal of S2 is first given to the R pixel corresponding to the first row of scanning line. Referring to FIG. 3, if the scan is reversed, the data signal of S2 is first given to the R pixel corresponding to the first row of scan line, but the first row of scan line corresponds to the G pixel after the reverse scan, which will cause a data signal disorder, incompatibility, and picture distortion.

Embodiment 2

Figure 4:
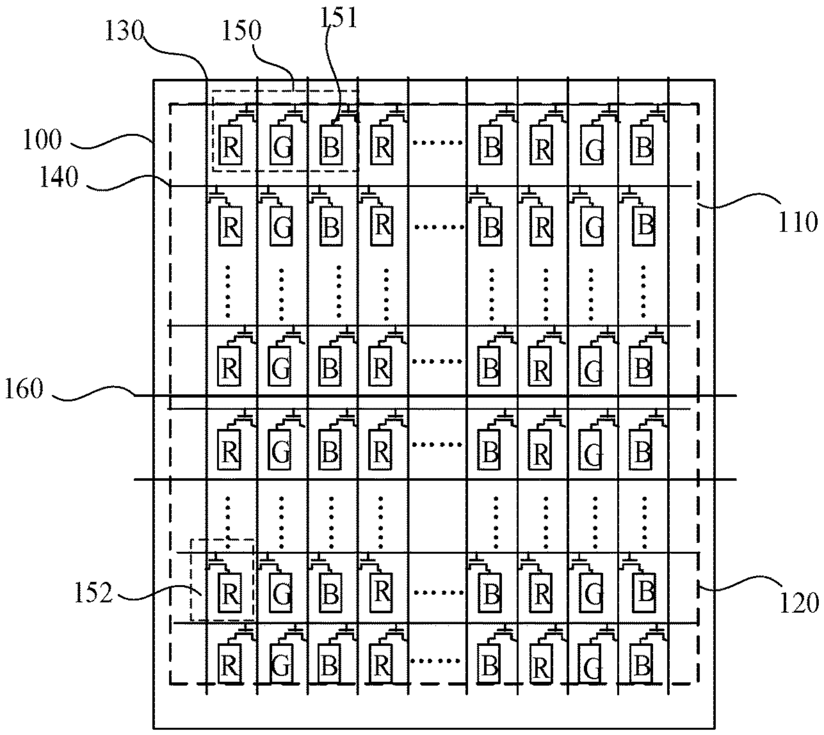
FIG. 4 is a schematic diagram of a pixel structure of a display panel according to a second embodiment of the present application.

FIG. 4 is a schematic diagram of a pixel structure of a display panel according to a second embodiment of the present application. As the second embodiment of this application, further refinements are made based on the first embodiment. As illustrated in FIG. 4, the sub-pixel group 152 includes only one sub-pixel 151. To achieve symmetry of the pixels in the upper and lower areas, it is only necessary to change the arrangement of the sub-pixels in the middle row. In the first area or the second area 120, in the same column of sub-pixels 151, the sub-pixel 151 corresponding to the last row of scan line 140 in the first area 151 and the sub-pixel 151 corresponding to the first row of scan line in the second area 120 are connected to the same data line 130. The polarities of the data driving signals on the same data line are the same, and the same data line uses the data driving signals with the same polarity, which is not only convenient to set, but also can save power consumption.

Further, the distance between the sub-pixels 151 corresponding to the last row of scan line in the first area 110 and the sub-pixels 151 corresponding to the first row of scan line in the second area 120 is the first distance. The distance between two sub-pixels 151 corresponding to two adjacent rows of scan lines 140 in the first area 110 or the second area 120 is the second distance. The lengths of the first interval and the second interval are the same. From the first row of sub-pixels 151 in the first area 110 to the last row of sub-pixels 151 in the second area, the distance between any two adjacent rows of sub-pixels 151 is the same, so that during the manufacturing process, there is no need to adjust the distance between the sub-pixels 151, it is only needed to guarantee that the sub-pixels 151 in the upper and lower area are completely symmetrical, so that the processing time can be reduced.

Figure 5:
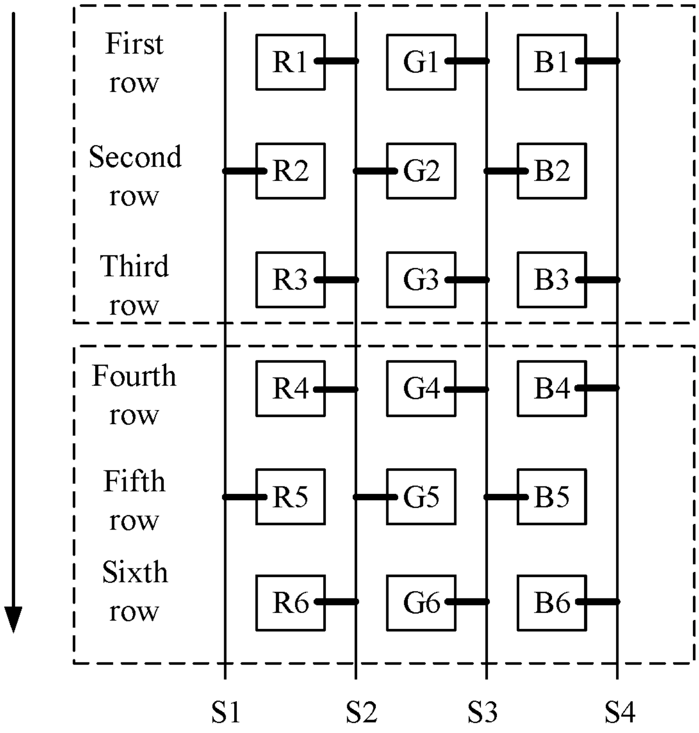
FIG. 5 is a schematic diagram of a forward scan of a novel architecture of the second embodiment of the present application.
Figure 6:
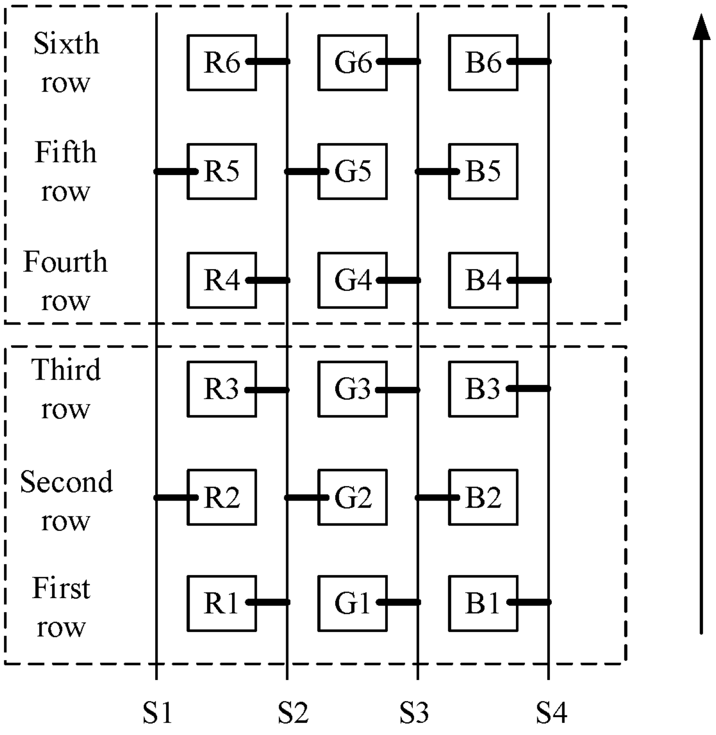
FIG. 6 is a schematic diagram of a reverse scan of a novel architecture of the second embodiment of the present application.

For the exemplary pixel architecture, the present application has made improvements, which can be further understood with reference to FIG. 5 and FIG. 6. FIG. 5 is a schematic diagram of a forward scan of the novel architecture of the second embodiment of the present application. FIG. 6 is a schematic diagram of a reverse scan of the novel architecture of the second embodiment of the present application. The new flip pixel architecture of the present application divides an entire flip pixel architecture into two symmetrical flip pixel architectures; in this way, there is no need to worry about the incompatibility of data signals. FIGS. 5 and 6 show some pixels in the display panel for illustration, which does not mean that only these pixels have this effect. The following describes the novel flip pixel architecture of the present application. Taking the following six rows of flip pixel architectures as an example, the first to third rows are used as a flip pixel architecture, and the fourth and sixth rows are used as a flip pixel architecture.

During forward scanning (from top to bottom), the sub-pixels are charged normally. When the first row, the second row, and the third row are turned on, the data of the odd-numbered sub-pixels R1 and R3 in the first column is given by S2, and the data of the even-numbered sub-pixel R2 in the first column is given by S1. The data of the odd-numbered sub-pixels G1 and G3 in the second column is given by S3, and the data of the even-numbered sub-pixel G2 in the second column is given by S3. When the fourth row is turned on, the data in the second column is still given by S3, and the fifth and sixth rows are charged normally as a flip pixel architecture as the fourth row.

When scanning in reverse (from bottom to top), the sixth and fifth rows are charged normally first. When the fourth row is turned on, the data in the second column is given by S3. When the third row is turned on, the data in the second column is still given by S3, and where the second row and the first row are normally charged as a flip pixel architecture as the third row.

Embodiment 3

Figure 7:
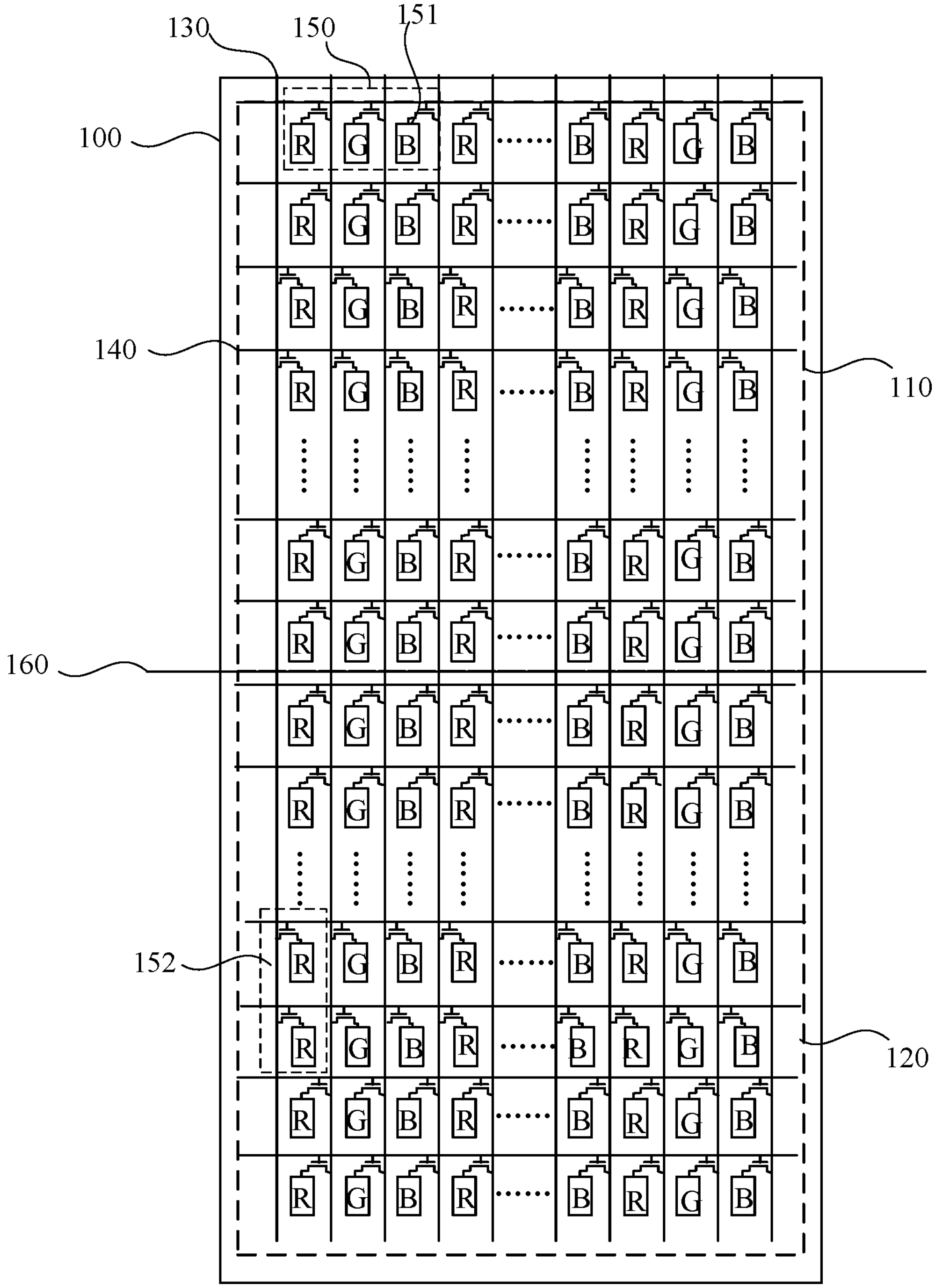
FIG. 7 is a schematic diagram of a pixel structure of a display panel according to a third embodiment of the present application.

FIG. 7 is a schematic diagram of a display panel according to a third embodiment of the present application. As the third embodiment of the present application, which is also a further refinement of the first embodiment, different from the above-mentioned second embodiment, each sub-pixel group 152 only includes two sub-pixels 151. In the first area 110 or the second area 120, in the same column of sub-pixels 151, the sub-pixels 151 corresponding to the last two rows of scan lines 140 in the first area 110 and the sub-pixels corresponding to the first two rows of scan lines 140 in the second area 120 are connected to the same data line 130.

A brief description is given by taking 4 scan lines 140 as one cycle. In the first area 110, the pixel arrangements of the first row of scan line and the second row of scan line and the connected data lines are the same. For example, the R sub-pixels of the first and second scan lines are connected to the second data line at the same time, the G sub-pixels of the first and second scan lines are connected to the third data line, the B sub-pixels of the first row of scan lines and the second scan lines are connected to the fourth data line. The pixel arrangements of the third row scan line and the fourth row scan line and the connected data lines are also the same. For example, the R sub-pixels of the third and fourth scan lines are connected to the first data line at the same time, the G sub-pixels of the third and fourth scan lines are connected to the second data line, and the B sub-pixels of third and fourth scan lines are connected to the third data line. By analogy, the pixel arrangements and the connected data lines of the last scan line and the second last scan line of the first area 110 are the same.

In the second area 120, the scan lines are arranged from top to bottom, that is, the scan line closest to the first area 110 is the first scan line, and the scan line farthest from the first area is the last scan line. The R sub-pixels of the last row of scan line and the second last scan line in the second area are connected to the second data line at the same time. The G sub-pixels of the first row of scan line and the second row of scan line are connected to the third data line. The B sub-pixels of the first row of scan line and the second row of scan line are connected to the fourth data line. The pixel arrangements of the third last row of scan line and the fourth last row of scan line and the connected data lines are also the same. For example, the R sub-pixels of the third-to-last row of scan line and the fourth-to-last row of scan line are connected to the first data line at the same time. The G sub-pixels of the third row of scan line and the fourth row of scan line are connected to the second data line. The B sub-pixels of the third row of scan line and the fourth row of scan line are connected to the third data line. By analogy, the pixel arrangements of the sub-pixels in the first row of scan line and the second row of scan line and the connected data lines 130 in the second area 120 are the same.

Embodiment 4

Figure 8:
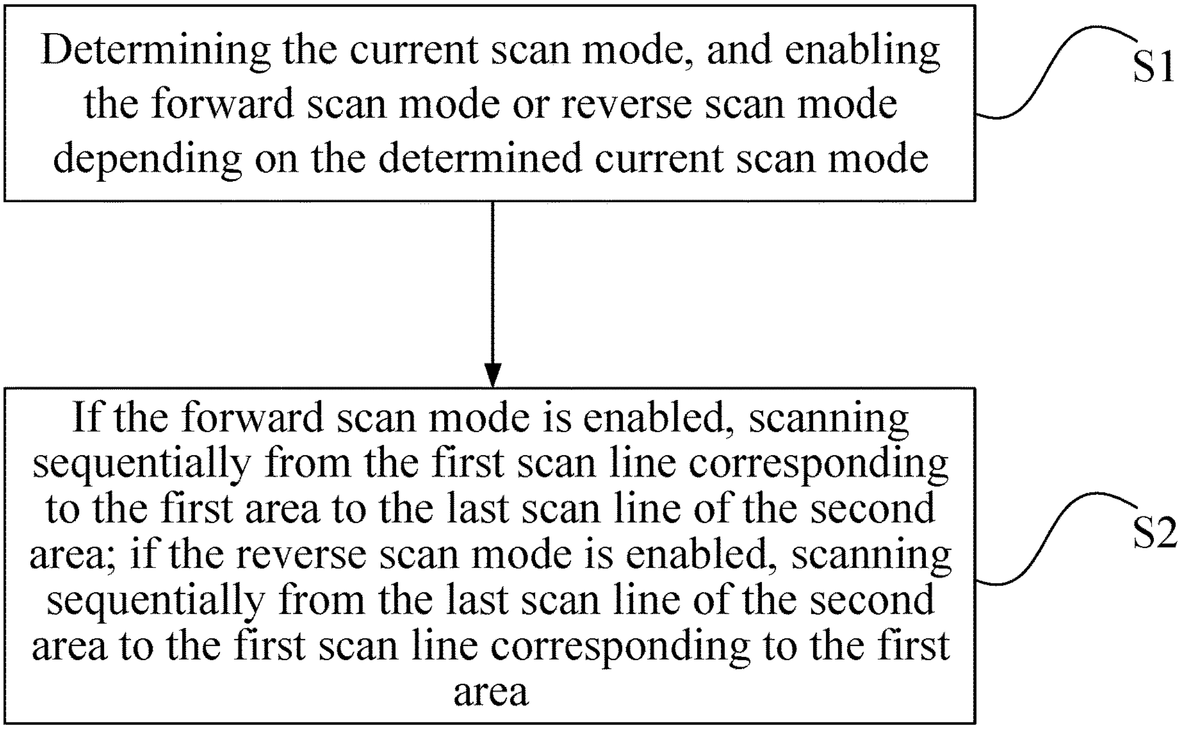
FIG. 8 is a schematic diagram of a driving method of a fourth embodiment of the present application.

FIG. 8 is a schematic diagram of a driving method of the fourth embodiment of the present application. As a fourth embodiment of the present application, a driving method is disclosed, which can be used to drive the display panel described in any of the above embodiments. As illustrated in FIG. 8, the driving method includes the following operations:

S1: determining the current scan mode, and starting the forward scan mode or the reverse scan mode depending on the current scan mode;

S2: if the forward scan mode is enabled, scanning sequentially from the first row of scan line corresponding to the first area to the last row of scan line in the second area; if the reverse scan mode is enabled, scanning sequentially from the last row of scan line in the second area to the first row of scan line corresponding to the first area.

The sub-pixel groups in the first area and the corresponding sub-pixel groups in the second area are axially symmetrically arranged with respect to the boundary line between the first area and the second area, and the current scanning mode is determined, and the forward scan mode or the reverse scan mode is enabled depending on the determined current scanning mode. If the forward scan mode is activated, scan sequentially from the first row of scan line corresponding to the first area to the last row of scan line in the second area. If the reverse scan mode is activated, scan sequentially from the last scan line of the second area to the first scan line corresponding to the first area to realize the mirror image of the reverse scan of the flip pixel architecture, so there is no need to worry about the data incompatibility when the scan lines are scanned forward or backward.

Further operation S1 includes the following operations:

S11: obtaining a signal reflecting the current scan mode, analyzing the signal according to a preset rule, and obtaining the current scan mode; starting the forward scan mode or the reverse scan mode according to the current scan mode.

Before a specific scan mode is turned on, obtain a signal reflecting the current scan mode, analyze the signal according to a preset rule, and obtain the current scan mode; start the forward scan mode or the reverse scan mode according to the current scan mode. There is no need to add or change hardware, and it can be implemented by software. As long as the signal that can reflect the current scanning mode is changed, different modes can be switched.

In addition, in the same frame, the polarities of the data driving signals on the same data line are the same, so it is more convenient to set the polarities of the data driving signals, and the same data line uses the data driving signals with the same polarity, which can save power consumption.

Embodiment 5

Figure 9:
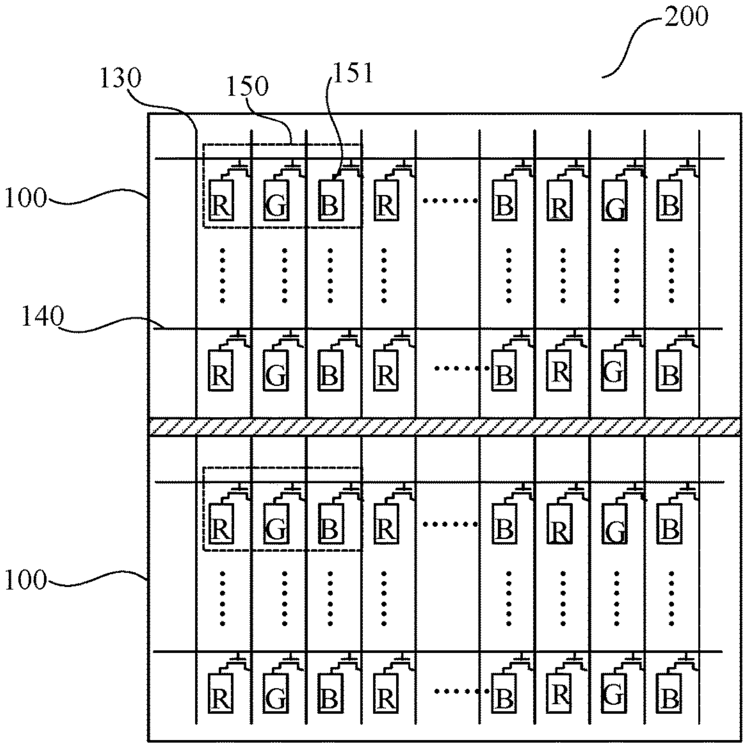
FIG. 9 is a schematic diagram of of a assembled screen of a fifth embodiment of the present application.
Figure 10:
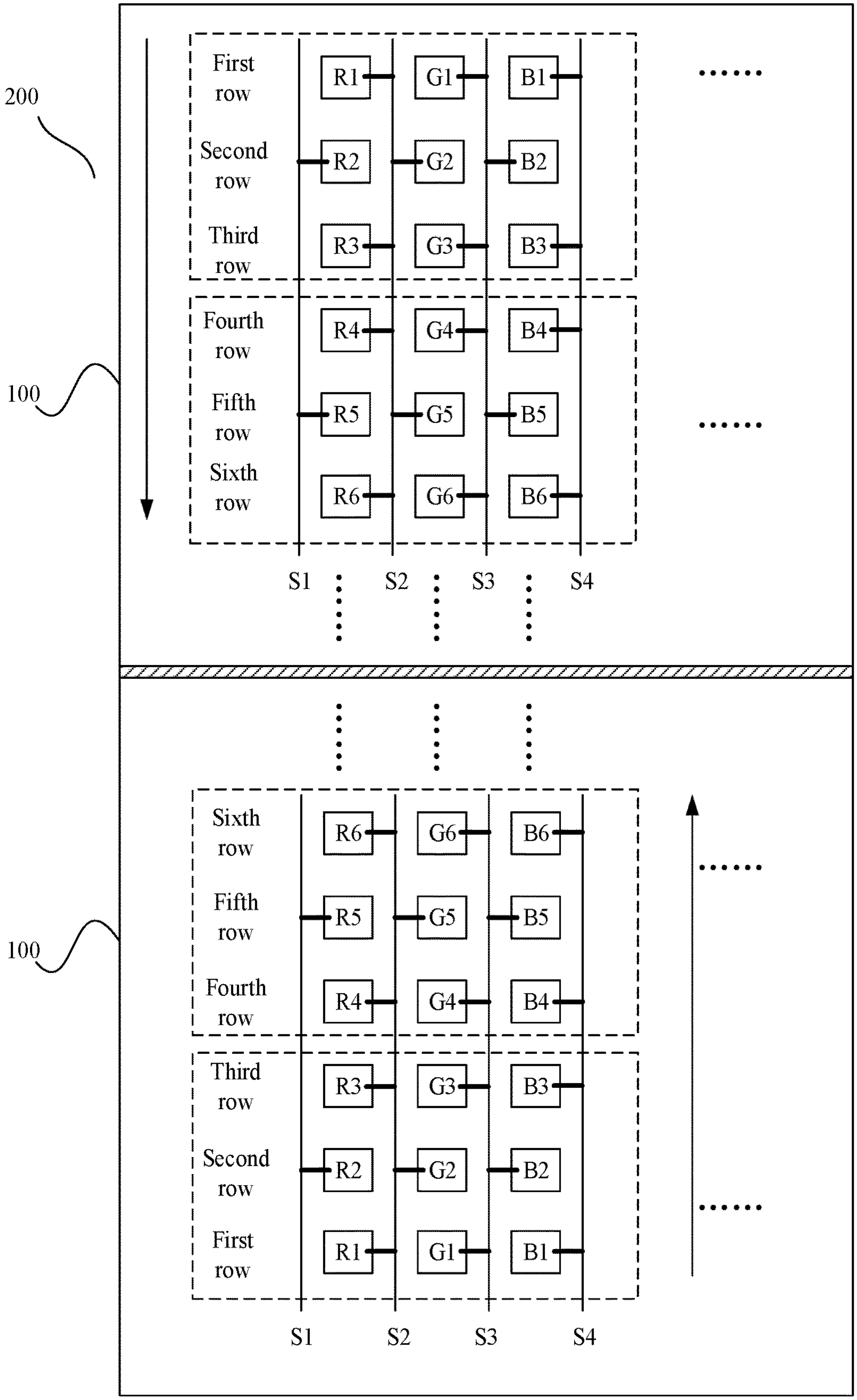
FIG. 10 is a schematic diagram of driving scanning of the assembled screen according to the fifth embodiment of the present application.

FIG. 9 is a schematic diagram of an assembled screen of a fifth embodiment of the present application. FIG. 10 is a schematic diagram illustrating driving scanning of the assembled screen according to the fifth embodiment of the present application. As illustrated in FIG. 9, as another embodiment of the present application, an assembled screen 200 is disclosed, which includes at least two display panels 100 as described in any of the above embodiments along the direction of the data line 130, where the two display panels 100 are assembled up and down. Of course, four display panels can also be assembled into two rows and two columns. Further, as illustrated in FIG. 10, the scanning modes of two adjacent display panels 100 are opposite. That is, the upper display panel adopts the forward scan mode, and the lower display panel adopts the reverse scan mode. In this way, the image at the joining position is more delicate and smooth, which brings a better visual experience to the human eye. Of course, the two display panels can also adopt the same scanning mode, and the corresponding scanning mode can be used depending on the specific usage.

Embodiment 6

Figure 11:
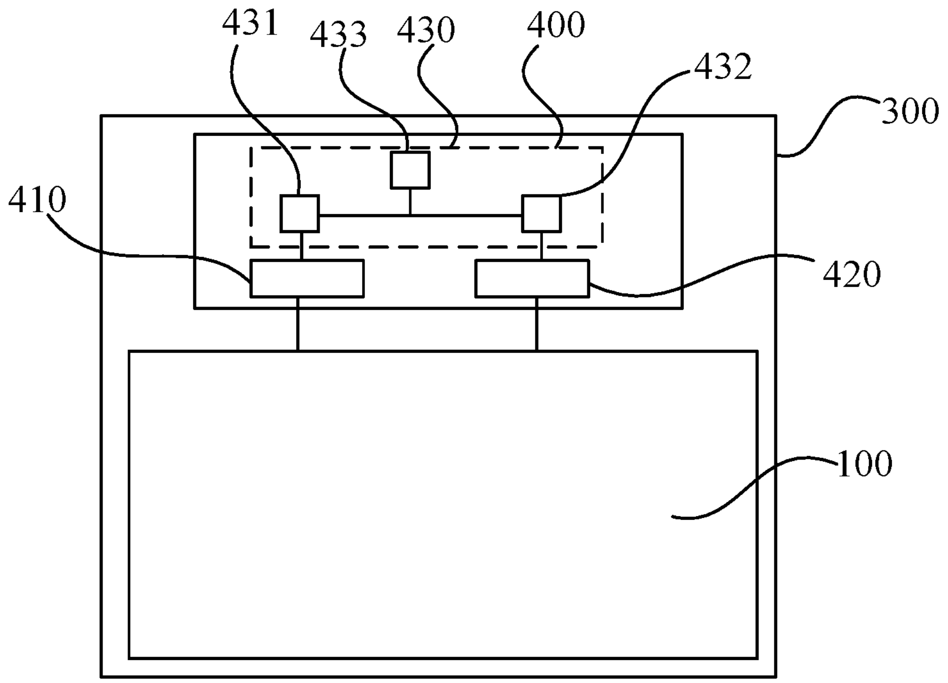
FIG. 11 is a schematic diagram of a display device according to a sixth embodiment of the present application.

FIG. 11 is a schematic diagram of a display device according to the sixth embodiment of the present application. As illustrated in FIG. 11, as another embodiment of the present application, a display device 300 is disclosed, including the display panel 100 described in any of the above embodiments and a driving circuit 400, and the driving circuit 400 drives the display panel 100.

The driving circuit 400 includes a forward scanning module 410, a reverse scanning module 420 and an analysis module 130. The analysis module 430 includes an input end, a first output end and a second output end. The first output end is connected with the input end of the forward scanning module 410, and the second output end is connected with the input end of the reverse scanning module 420. The input end of the analysis module 430 is used to obtain a signal that reflects the current scan mode, and analyzes the signal according to a preset rule to obtain the current scan mode. If the current scanning mode is the forward scanning mode, the forward scanning module 410 is driven to operate through the first output end. If the current scan mode is the reverse scan mode, the reverse scan module 420 is driven to operate through the second output end.

Specifically, the analysis module 430 further includes a first switch circuit 431, a second switch circuit 432 and an analysis circuit 433. The analysis circuit 433 analyzes the received signal and outputs a corresponding control signal to the two switches according to the preset rule. The corresponding switch is turned on when it receives the turned-on signal to start the corresponding scan mode. For example, the preset rule is that if the first segment of the waveform of the data signal is at a high level, it corresponds to the forward scan mode, and if the first segment of the waveform of the data signal is at a low level, it corresponds to the reverse scan mode. The analyzing circuit 433 analyzes that the first segment of the waveform is a high level, and outputs a high level signal that turns on the first switch circuit 431 to turn on the first switch circuit 431 to start the forward scan mode. The analyzing circuit 433 analyzes that the first segment of waveform is a low level, and outputs a low level signal that turns on the second switch circuit 432 to turn on the second switch circuit 432 to start the reverse scan mode. The turn-on signals of the first switch circuit and the second switch circuit are opposite. The first switch circuit includes a high-level conduction switch, and the second switch circuit includes a low-level conduction switch. The forward and reverse scanning can be realized without adding or modifying other hardware.

It should be noted that the description of various steps involved in this solution are not to be construed as limiting the order of steps, if the implementation of the specific solution is not affected. That is, the steps written in earlier can be performed before, or after, or even at the same time as those written later. As long as this solution can be implemented, any order of the steps should be regarded as falling in the scope of protection of this application.

It should be noted that the inventive concept of the present application can form a large number of embodiments, but they cannot be enumerated because the length of the application document is limited. The technical features as set forth herein can be arbitrarily combined to form a new embodiment, and the original technical effects may be enhanced after various embodiments or technical features are combined.

The technical solutions of the present application may be widely used in various display panels, such as TN (Twisted Nematic) display panels, IPS (In-Plane Switching) display panels, VA (Vertical Alignment) display panels, and MVA (Multi-Domain Vertical Alignment) display panels. Of course, the above solutions are also applicable to other types of display panels, such as OLED (Organic Light-Emitting Diode) display panels.

The foregoing is a further detailed description of the present application in conjunction with specific optional embodiments, but it should not be construed as that the specific implementation of the present application will be limited to these descriptions. For those having ordinary skill in the technical field of the present application, without departing from the scope and spirit of the present application, some simple deductions or substitutions can be made, which should all be regarded as falling in the scope of protection of the present application.

What is claimed is:

1. A display panel, comprising a plurality of data lines, a plurality of scan lines, and a plurality of pixels, wherein each of the plurality of pixels comprises a plurality of sub-pixels of different colors, and the plurality of the scan lines and the data lines cross over each other; wherein each of the plurality of sub-pixels are driven by the respective data line and respective scan line;

wherein the display panel is divided into a first area and a second area, which are arranged along a direction of the plurality of data lines; wherein each of the plurality of pixels comprises a plurality of sub-pixels of different colors, and the sub-pixels in a same column have a same color; wherein the number of sub-pixels in the first area is the same as the number of the sub-pixels in the second area; wherein a plurality of sub-pixels corresponding to each same row of scan line are connected to the respective data lines in one-to-one correspondence;

wherein in the first area and the second area, each column of sub-pixels is arranged between two adjacent data lines, the same column of sub-pixels comprises a plurality of sub-pixel groups, and each of the sub-pixel groups comprises at least one sub-pixel; wherein along the direction of the data lines, the plurality of sub-pixel groups are divided into odd groups and even groups, and among the two adjacent data lines, one of the data lines is connected to the sub-pixels in the odd groups, and the other data line is connected to the sub-pixels in the even groups;

wherein the sub-pixel groups in the first area are axially symmetrical with the corresponding sub-pixel groups in the second area with respect to a boundary line between the first area and the second area;

wherein each sub-pixel group comprises only two sub-pixels, and in the first area or the second area, in each same column of sub-pixels, the sub-pixels corresponding to last two rows of scan lines in the first area and the sub-pixels corresponding to first two rows of scan lines in the second area are connected to a same data line.

2. The display panel of claim 1, wherein an interval between the sub-pixels corresponding to a last row of scan line in the first area and the sub-pixels corresponding to a first row of scan line in the second area is a first interval, an interval between two sub-pixels corresponding to two adjacent rows of scan lines in each of the first area or the second area is a second interval, and wherein the first interval and the second interval have a same length.

3. The display panel of claim 2, wherein the sub-pixels connected to each same data line have a same pixel polarity.

4. The display panel of claim 1, wherein the sub-pixels connected to each same data line have a same pixel polarity.

5. A driving method, applicable to drive the display panel of claim 1, the driving method comprising:

determining a current scan mode, and enabling a forward scan mode or a reverse scan mode depending on the determined current scan mode;

if the forward scan mode is enabled, scanning sequentially from the first row of scan line corresponding to the first area to the last row of scan line in the second area; if the reverse scan mode is enabled, scanning sequentially from the last row of scan line of the second area to the first row of scan line of the first area.

6. The driving method of claim 5, wherein the operation of determining a current scan mode, and enabling a forward scan mode or a reverse scan mode depending on the determined current scan mode comprises:

obtaining a signal reflecting the current scan mode, analyzing the signal according to a preset rule, and obtaining the current scan mode; enabling the forward scan mode or the reverse scan mode according to the current scan mode.

7. The display panel of claim 1, wherein the sub-pixels connected to each same data line have a same pixel polarity.

8. A display device, comprising a display panel and a driving circuit, wherein the driving circuit is configured to drive the display panel, wherein the display panel comprises a plurality of data lines, a plurality of scan lines, and a plurality of pixels, wherein each of the plurality of pixels comprises a plurality of sub-pixels of different colors, and the plurality of the scan lines and the data lines cross over each other; wherein each of the plurality of sub-pixels are driven by the respective data line and respective scan line;

wherein the display panel is divided into a first area and a second area, which are arranged along a direction of the plurality of data lines; wherein each of the plurality of pixels comprises a plurality of sub-pixels of different colors, and the sub-pixels in a same column have a same color; wherein the number of sub-pixels in the first area is the same as the number of the sub-pixels in the second area; wherein a plurality of sub-pixels corresponding to each same row of scan line are connected to the respective data lines in one-to-one correspondence;

wherein in the first area and the second area, each column of sub-pixels is arranged between two adjacent data lines, the same column of sub-pixels comprises a plurality of sub-pixel groups, and each of the sub-pixel groups comprises at least one sub-pixel; wherein along the direction of the data lines, the plurality of sub-pixel groups are divided into odd groups and even groups, and among the two adjacent data lines, one of the data lines is connected to the sub-pixels in the odd groups, and the other data line is connected to the sub-pixels in the even groups;

wherein the sub-pixel groups in the first area are axially symmetrical with the corresponding sub-pixel groups in the second area with respect to a boundary line between the first area and the second area;

wherein each sub-pixel group comprises only two sub-pixels, and in the first area or the second area, in each same column of sub-pixels, the sub-pixels corresponding to last two rows of scan lines in the first area and the sub-pixels corresponding to first two rows of scan lines in the second area are connected to a same data line.

9. The display device of claim 8, wherein the display device comprises at least two adjacent display panels arranged along a direction of the data lines, and wherein scanning directions of the adjacent display panels are opposite.

10. The display device of claim 8, wherein the driving circuit comprises a forward scanning module, a reverse scanning module, and an analysis module;

wherein the analysis module comprises an input end, a first output end, and a second output end;

wherein the first output end of the analysis module is connected to an input end of the forward scanning module, and the second output end of the analysis module is connected to an input end of the reverse scanning module;

wherein the input end of the analysis module is configured to obtain a signal reflecting the current scanning mode, and analyze the signal according to a preset rule to obtain the current scanning mode; if the current scanning mode is the forward scanning mode, the forward scanning module is driven to operate through the first output end; if the current scan mode is the reverse scan mode, the reverse scan module is driven to operate through the second output end.

11. The display device of claim 8, wherein an interval between the sub-pixels corresponding to a last row of scan line in the first area and the sub-pixels corresponding to a first row of scan line in the second area is a first interval, an interval between two sub-pixels corresponding to two adjacent rows of scan lines in each of the first area or the second area is a second interval, and wherein the first interval and the second interval have a same length.

12. The display panel of claim 11, wherein the sub-pixels connected to each same data line have a same pixel polarity.

13. The display panel of claim 8, wherein the sub-pixels connected to each same data line have a same pixel polarity.

* * * * *